United States Patent
Lyon

(10) Patent No.: US 7,111,611 B1
(45) Date of Patent: Sep. 26, 2006

(54) TORQUE SENSOR-BASED ENGINE AND POWERTRAIN CONTROL SYSTEM

(75) Inventor: Kim M Lyon, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/231,477

(22) Filed: Sep. 21, 2005

(51) Int. Cl.
*F02D 9/08* (2006.01)

(52) U.S. Cl. .............. 123/399; 123/90.15; 123/406.23; 123/436; 180/65.2; 180/65.4

(58) Field of Classification Search .. 123/90.15–90.18, 123/350, 399, 406.23, 436; 180/65.2, 65.4
See application file for complete search history.

(56) References Cited

U.S. PATENT DOCUMENTS

| | | | |
|---|---|---|---|
| 5,823,280 A | * | 10/1998 | Lateur et al. .............. 180/65.2 |
| 5,984,033 A | * | 11/1999 | Tamagawa et al. ........ 180/65.4 |
| 6,036,285 A | | 3/2000 | Murphy |
| 6,119,063 A | | 9/2000 | Hieb et al. |
| 6,123,163 A | * | 9/2000 | Otsu et al. ................. 180/65.4 |
| 6,260,644 B1 | * | 7/2001 | Otsu ......................... 180/65.3 |
| 6,553,958 B1 | | 4/2003 | Kolmanovsky |
| 6,845,305 B1 | | 1/2005 | Raftari et al. |

* cited by examiner

*Primary Examiner*—Erick R Solis
(74) *Attorney, Agent, or Firm*—Thomas A. Jurecko

(57) ABSTRACT

A system for controlling a vehicle that includes an engine comprises a controller having an input for receiving an engine torque input command indicative of a desired amount of torque to be generated by the engine, and an output for providing an engine torque output command to the engine. A torque sensor is operatively connected to the engine and the controller. The torque sensor is adapted to measure torque output of the engine and to transmit a signal indicative of the measured torque to the controller. The controller is configured to adjust the engine torque output command provided to the engine using torque feedback control based on the signal received from the torque sensor.

17 Claims, 2 Drawing Sheets

TORQUE SENSOR-BASED ENGINE AND POWERTRAIN CONTROL SYSTEM

BACKGROUND

Conventional torque-based vehicle engine control systems typically rely on a model-based estimator of engine torque. Model-based estimators, while sufficient for early generation torque-based engine control systems where relatively small steady-state error and transient error are not an issue, are usually not comprehensively verified during development or in actual production vehicles to ensure accuracy of the estimated engine torque levels. As new demands are placed on torque-based engine control systems, a more accurate determination of engine torque is desired.

SUMMARY

A system for controlling a vehicle that includes an engine comprises a controller having an input for receiving an engine torque input command indicative of a desired amount of torque to be generated by the engine, and an output for providing an engine torque output command to the engine. A torque sensor is operatively connected to the engine and the controller. The torque sensor is adapted to measure torque output of the engine and to transmit a signal indicative of the measured torque to the controller. The controller is configured to adjust the engine torque output command provided to the engine using torque feedback control based on the signal received from the torque sensor.

BRIEF DESCRIPTION OF THE DRAWINGS

Embodiments of the invention will now be described, by way of example, with reference to the accompanying drawings, wherein.

DETAILED DESCRIPTION

Figure 1:
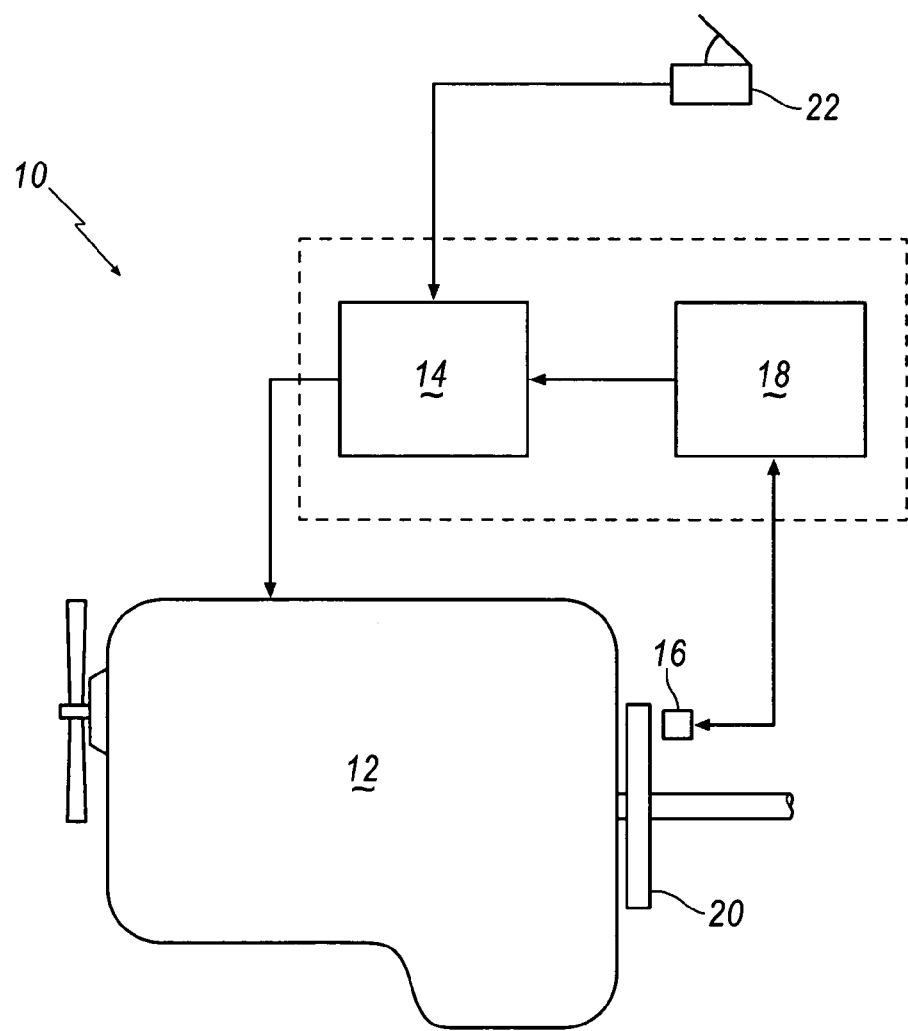
FIG. 1 is a schematic illustration of a torque sensor-based control system according to an embodiment of the present invention.

Referring to FIG. 1, a torque sensor-based engine control system 10 according to an embodiment of the present invention is shown for controlling a vehicle that includes an engine 12. In the illustrated embodiment, system 10 includes a controller 14 having an input for receiving an engine torque input command indicative of the desired amount of torque to be generated by engine 12, and an output for providing an engine torque output command to engine 12. A torque sensor 16 is operatively connected to engine 12 and controller 14. Torque sensor 16 is adapted to measure torque output of engine 12 and to transmit a signal indicative of the measured torque to controller 14. Controller 14 is configured to adjust the engine torque output command provided to engine 12 using torque feedback control based on the signal received from torque sensor 16.

In an embodiment, torque sensor 16 comprises a Surface Acoustic Wave (SAW) type torque sensor, such as, for example, a double-SAW torque sensor. A SAW-type torque sensor may function as a resonator whose resonant frequency changes as the sensor is strained. A SAW-type torque sensor may be wirelessly excited using radio frequencies and the resonant frequency response may be measured allowing the strain to be determined. Torque may be determined by comparing the measured frequency response to predetermined frequency responses associated with a given torque value. When configured as a wireless sensor, torque sensor 16 may be operatively connected to an engine flywheel or drive-plate 20, or other powertrain component, such as the output shaft of engine 12 and various transmission components (not shown). Controller 14 may include or otherwise communicate with a torque sensor processor 18 that excites torque sensor 16 and measures the resonant frequency response.

In the embodiment shown in FIG. 1, controller 14 may receive the engine torque input command from a vehicle throttle pedal 22, for example. The engine torque output command generated by controller 14 is configured to control at least one of the delivery of fuel to engine 12, engine ignition, engine valve timing, electronic throttle control set-point, and intake manifold tuning configuration. Accordingly, the feedback provided by torque sensor 16 may be used to control engine 12 in a closed-loop manner.

When employed in a vehicle, torque sensor-based engine control system 10 provides accurate torque information regardless of the vehicle mileage or level of component wear. This feature can overcome limitations in prior art model-based torque estimators were, as vehicle mileage grows and components wear, the actual torque produced by the vehicle engine may begin to deviate from the calibrated "as new" torque built into the model, resulting in increased engine emissions, loss of torque control, and compromised driveability of the vehicle. The torque-sensor based control system of the present invention also overcomes a model-based torque estimator's inability to account for engine-to-engine tolerance effects that may cause the torque output to substantially deviate from the calibrated torque output by measuring the actual torque output of the engine.

In an embodiment, controller 14 may be configured to store engine torque measurements in a matrix that correlates an engine torque measurement with at least one vehicle operating parameter, such as, for example, engine speed, engine load, charge-air temperature, barometric pressure, engine coolant temperature, and engine accessory load. The "matrix" may comprise various, charts, tables, templates, and other arrays or formats of data. If desired, the matrix may be an adaptive matrix, whereby stored engine torque measurements are periodically updated to maintain an accurate map of engine torque potential. When so equipped, controller 14 may be configured to selectively review the adaptive matrix of stored engine torque measurements and to predict future engine torque based on one or more vehicle operating parameters. The adaptive matrix may be initially populated with nominal values of engine torque for one or more vehicle operating parameters using the measurements obtained by torque sensor 16. When so operated, controller 14 may update the adaptive matrix with engine torque measurements during initial operation of the engine and/or throughout the operative life of engine 12 to account for engine component wear or tolerance effects.

Over time, individual engine cylinders may begin to differentiate themselves with regard to torque output as a result of component wear. Controller 14 may be configured to detect engine misfiring by monitoring alterations in the torque output of engine 12. When so configured, controller 14 can compare the measured torque output of engine 12 during a given engine cylinder firing with a predetermined torque output and then modify operation of engine 12 when the measured torque output deviates from the predetermined torque output by a predetermined amount.

Figure 2:
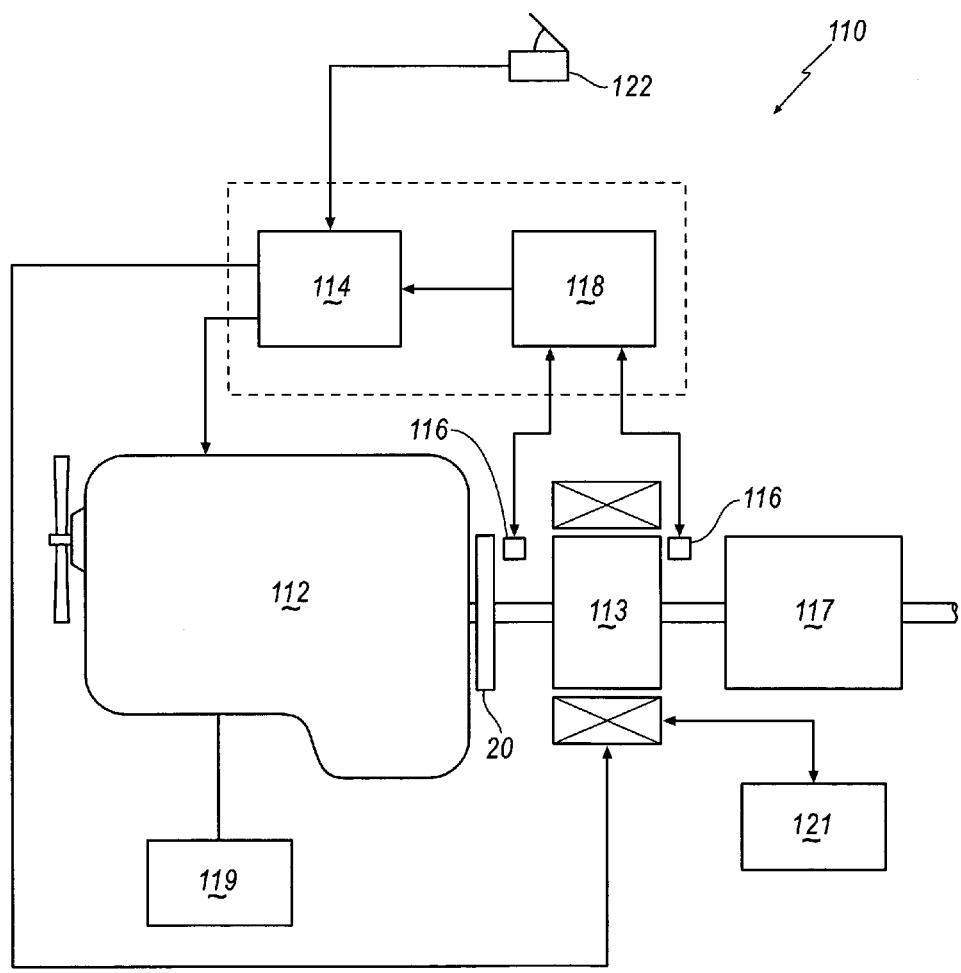
FIG. 2 is a schematic illustration of a torque sensor-based control system according to another embodiment of the present invention.

Referring to FIG. 2, a torque sensor-based engine control system 110 according to another embodiment of the present invention is shown for controlling a hybrid electric vehicle that includes an engine 112 and an electric traction motor or electric motor/generator 113. In the illustrated embodiment, system 110 includes a controller 114 having an input for receiving an engine torque input command indicative of the desired amount of torque to be generated by engine 112 and/or motor 113, and an output for providing an engine torque output command to engine 112 and/or motor 113. A torque sensor 116 is operatively connected to engine 112 and/or motor 113, and is configured to provide a signal to controller 114 (which may be via an optional torque sensor processor 118) indicative of torque generated by engine 112 and/or motor 113. If provided, torque sensor processor 118 may be a separate unit or, alternatively, may be integrated with controller 114. Controller 114 can be configured to adjust the engine torque output command provided to engine 112 and/or motor 113 using torque feedback control based on a signal received from torque sensor(s) 116.

It will be appreciated that torque sensor-based engine control system 110 is not limited to use in the hybrid electric vehicle arrangement shown in FIG. 2 and may be used in other hybrid electric vehicle powertrain arrangements including, without limitation, those that employ an internal combustion engine and an electric traction motor cooperating in a parallel or series relationship. Additionally, as illustrated in FIG. 2, the vehicle may include various torque-sump devices, such as, for example, a transmission 117 or a generator 119, and torque storage devices, including, without limitation, a battery, a capacitor or a fluid reservoir (denoted generically as 121). Controller 114 may receive the engine torque input command from a vehicle throttle pedal 122, for example, such that the feedback provided by torque sensor(s) 116 may be used to control engine 112 and/or motor 113 in a closed-loop manner.

In many vehicle transmissions, shift quality is dependent upon the accurate determination of engine torque, especially when crossing the "zero torque" line. A relatively small error in the estimation of torque may be acceptable in partial throttle settings or at wide-open throttle, but near the "zero torque" line, small errors (e.g., up to about 10%) may compromise normal operation of the transmission and transmission shifting smoothness. Additionally, errors in torque estimation that straddle the "zero torque" line (e.g., ±5% of the "zero torque" line) may cause transmission controller shift corrections that are directionally incorrect or of improper magnitude and transmission shifts to be harsh and untimely. In an embodiment of the present invention, controller 114 and/or torque sensor(s) 116 may be configured to provide transmission 117 with a signal indicative of the instantaneous measured engine 112 and/or motor 113 torque to facilitate smooth and timely shifting of transmission 117 from one gear to another.

Among other features, the torque sensor-based engine control systems according to the present invention may reduce the cost and complexity associated with developing a vehicle engine by virtue of the torque sensor-based control system's ability to measure actual torque. In a model-based estimator, by contrast and example, the development cost of a vehicle powertrain system is generally proportional to the number of engines tested in a dynamometer and only then do a significant number of tested engines provide any statistical certainty regarding the accuracy of the model-based torque estimator algorithms. Further, engine dynamometer testing may not identify torque variation and estimation error caused by engine wear, and may not account for variations in engine torque due to extreme temperatures and barometric pressures-conditions that are generally not evaluated in a dynamometer. Moreover, since model-based estimators rely largely on steady-state dynamometer information for calibration and verification accuracy, model-based torque models can be inaccurate under transient engine conditions where engine speed and load are varying with time. Under transient conditions, the model-based estimator must calculate the instantaneous torque as engine speed and load vary, and interpolate projected engine speed and load changes, allowing two kinds or error to propagate-instantaneous error and interpolation error. The torque sensor-based control systems according to the present invention, by contrast, helps minimize instantaneous and interpolation error by measuring actual torque levels virtually instantaneously and, if necessary, looking-ahead in a self-populated adaptive matrix of stored torque values to where the projected engine speed and load will (or is projected) to be.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A system for controlling a vehicle that includes an engine, comprising:

a controller having an input for receiving an engine torque input command indicative of a desired amount of torque to be generated by the engine, and an output for providing an engine torque output command to the engine; and a torque sensor operatively connected to the engine and the controller, the torque sensor adapted to measure torque output of the engine and to transmit a signal indicative of the measured torque to the controller;

wherein the controller is configured to adjust the engine torque output command provided to the engine using torque feedback control based on the signal received from the torque sensor; and wherein the controller stores measured engine torque measurements in a matrix for correlation with at least one vehicle operating parameter and updates the stored engine torque measurements.

2. The system of claim 1, wherein the engine torque output command is configured to control at least one of the delivery of fuel to the engine, engine ignition, engine valve timing, electronic throttle control set-point, and intake manifold tuning configuration.

3. The system of claim 1, wherein the torque sensor is operatively connected to an engine flywheel, drive-plate, or shaft.

4. The system of claim 1, wherein the vehicle operating parameter includes at least one of engine speed, engine load, charge air temperature, barometric pressure, engine coolant temperature, and engine accessory load.

5. The system of claim 1, wherein the matrix is an adaptive matrix, storing engine torque measurements to maintain an accurate map of engine torque potential.

6. The system of claim 5, wherein the controller is configured to selectively review the adaptive matrix of stored engine torque measurements and to predict future engine torque based on one or more vehicle operating parameters.

7. The system of claim 5, wherein the adaptive matrix is initially populated with values of engine torque for one or more vehicle operating parameters.

8. The system of claim 7, wherein the controller is configured to update the adaptive matrix with engine torque measurements during initial operation of the engine.

9. The system of claim 1, wherein the controller is configured to detect engine misfiring by monitoring alterations in the torque output of the engine.

10. The system of claim 9, wherein the controller is configured to compare the measured torque output of the engine during a given engine cylinder firing with a predetermined torque output and to modify operation of the engine when the measured torque output deviates from the predetermined torque output by a predetermined amount.

11. The system of claim 1, wherein the vehicle further includes an electric motor and a second torque sensor operatively connected to the electric motor and the controller, the second torque sensor adapted to measure torque output of the electric motor and to transmit a signal indicative of the measured torque to the controller; and wherein the controller is configured to adjust an electric motor torque output command provided to the electric motor using torque feedback control based on the signal received from the second torque sensor.

12. The system of claim 1, wherein the vehicle includes a transmission and the controller or the torque sensor is configured to provide the transmission with a signal indicative of the measured torque.

13. A system for controlling a vehicle that includes an engine, comprising:
a controller having an input for receiving an engine torque input command indicative of a desired amount of torque to be generated by the engine, and an output for providing an engine torque output command to the engine; and
a torque sensor operatively connected to the engine and the controller, the torque sensor adapted to measure torque output of the engine and to transmit a signal indicative of the measured torque to the controller;
wherein the controller is configured to store engine torque measurements in a matrix and update the matrix with engine torque measurements to maintain a map of engine torque potential.

14. The system of claim 13, wherein the matrix correlates an engine torque measurement with at least one vehicle operating parameter.

15. The system of claim 14, wherein the vehicle operating parameter includes at least one of engine speed, engine load, charge air temperature, barometric pressure, engine coolant temperature, and engine accessory load.

16. The system of claim 13, wherein the controller is configured to selectively review the matrix of stored engine torque measurements and to predict future engine torque based on one or more vehicle operating parameters.

17. The system of claim 13, wherein the matrix is initially populated with values of engine torque for one or more vehicle operating parameters.

* * * * *